United States Patent
Tieskoetter et al.

(10) Patent No.: US 7,973,950 B1
(45) Date of Patent: Jul. 5, 2011

(54) IMAGE PRINTING HISTORY

(75) Inventors: Kevin Tieskoetter, Santa Cruz, CA (US); Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1173 days.

(21) Appl. No.: 11/676,218

(22) Filed: Feb. 16, 2007

(51) Int. Cl.
- *G06F 3/12* (2006.01)
- *G06F 15/00* (2006.01)
- *G06K 15/00* (2006.01)
- *G06K 9/00* (2006.01)

(52) U.S. Cl. ...... 358/1.13; 358/1.9; 358/1.15; 358/1.16; 358/1.18; 382/167

(58) Field of Classification Search .................. 358/1.13, 358/1.15, 462, 468, 1.16, 1.18, 1.9; 399/82; 382/167
See application file for complete search history.

(56) References Cited

U.S. PATENT DOCUMENTS

| | | | |
|---|---|---|---|
| 6,567,177 B2 | 5/2003 | Matsuyama | |
| 6,603,483 B1 * | 8/2003 | Newman | 345/593 |
| 7,200,245 B2 | 4/2007 | Miyashita | |
| 7,298,511 B2 * | 11/2007 | Lay et al. | 358/1.15 |
| 7,342,682 B2 * | 3/2008 | Haikin et al. | 358/1.9 |
| 7,356,181 B2 * | 4/2008 | Haikin et al. | 382/167 |
| 7,375,860 B2 * | 5/2008 | Schlank et al. | 358/468 |
| 7,386,246 B2 * | 6/2008 | Yabe | 399/82 |
| 7,573,610 B2 * | 8/2009 | Um et al. | 358/1.9 |
| 7,684,063 B2 * | 3/2010 | Fujita et al. | 358/1.13 |
| 7,701,599 B2 * | 4/2010 | Kumashio | 358/1.15 |
| 7,706,027 B2 * | 4/2010 | Okabe et al. | 358/462 |
| 2005/0002058 A1 * | 1/2005 | Hirabayashi | 358/1.15 |
| 2005/0213132 A1 * | 9/2005 | Uejo | 358/1.13 |
| 2006/0285155 A1 * | 12/2006 | Yamada et al. | 358/1.15 |
| 2007/0046973 A1 * | 3/2007 | Toda | 358/1.13 |
| 2007/0182993 A1 * | 8/2007 | Yamada et al. | 358/1.15 |

* cited by examiner

*Primary Examiner* — James A Thompson
*Assistant Examiner* — Satwant K Singh
(74) *Attorney, Agent, or Firm* — Fish & Richardson P.C.

(57) ABSTRACT

Methods, program products and systems for accepting a first request to print a first image, which includes image data, using first settings that specify one or more nondestructive first transformations of the first image data that creates a first appearance of the first image. In response to the first request, a first association between a time of the first request, the first image, and the first settings is stored. A second request to print a second image, which includes second image data, using second settings is accepted. The second settings specify one or more nondestructive second transformations of the second image data that create a second appearance of the second image. In response to the second request, a second association between a time of the second request, the second image, and the second settings is stored.

24 Claims, 8 Drawing Sheets

IMAGE PRINTING HISTORY

BACKGROUND

The present disclosure relates to digital image manipulation.

Image manipulation software allows users to modify the appearance of color or black and white digital images (or "images") by applying a sequence of transformations to the image's data. For example, a user may apply a transformation that changes the brightness of an image. A transformation typically corresponds to one or more settings associated with the image (e.g., a brightness setting). The appearance of an image represents the cumulative effect of all previously applied transformations. Continuing the example above, an additional transformation that blurs the appearance of the image results in an image that appears both brighter and blurrier.

Frequently, photographers and other professionals may print multiple versions of an image, where each version of the image has different settings. For example, a client might want the color channels of an image adjusted to create a surreal effect. After some time has passed, the client or the professional may wish to recreate the printed version of the image. However, unless the image's settings at the time of the original printing were saved, it may be difficult or impossible to exactly duplicate the printed image.

SUMMARY

This specification describes technologies relating to digital image manipulation. In general, one aspect of the subject matter described in this specification can be embodied in a method that includes accepting a first request to print a first image using first settings. The first image comprises first image data. The first settings specify one or more nondestructive first transformations of the first image data that creates a first appearance of the first image. In response to the first request, a first association between a time of the first request, the first image, and the first settings is stored in a list where an association in the list is user-selectable through a graphical user interface. A second request to print a second image using second settings is accepted. The second image comprises second image data. The second settings specify one or more nondestructive second transformations of the second image data that create a second appearance of the second image. In response to the second request, a second association between a time of the second request, the second image, and the second settings is stored in the list. Other embodiments of this aspect include corresponding systems, apparatus, and computer program products.

These and other embodiments can optionally include one or more of the following features. User input selecting an association in the list can be accepted. The selected association's respective settings can be applied to the selected association's respective image data to determine transformed image data. The transformed image data can be provided to the graphical user interface or a printing device. Storing in the list can include maintaining an order of the list such that associations in the list are ordered according to their respective times. The first image and the second image can be the same; or the first image and the second image can be different. User input can be accepted specifying the first settings or the second settings. Image settings can include one or more of white balance adjustments, tone adjustments, split tone adjustments, color adjustments, detail adjustments, lens corrections, camera calibrations, and image effects. White balance adjustments can include temperature and color tint adjustments. Tone adjustments can include exposure, highlight recovery, fill light, blacks, brightness contrast and tone curve adjustments. Split tone adjustments can include highlight and shadow balance, and hue and saturation adjustments for each of highlights and shadows. Color adjustments can include vibrance, saturation, hue, luminance and color specific adjustments of each. Detail adjustments can include sharpening and noise reduction. Lens corrections can include chromatic aberration and lens vignetting adjustments. Image effects can include blur, crop, rotate, flip, invert, red-eye correction and spot healing.

Particular implementations of the subject matter described in this specification can realize one or more of the following advantages. A print marker, which associates the current settings of an image with a print request, is automatically created when an image is printed. Users do not have to remember to save an image's settings in order to recall the settings at a later time. A print marker's time and date allows users to view the print history of an image or determine the time of a particular print. Memory space is conserved by only storing the settings necessary to transform the image data rather than storing transformed image data.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
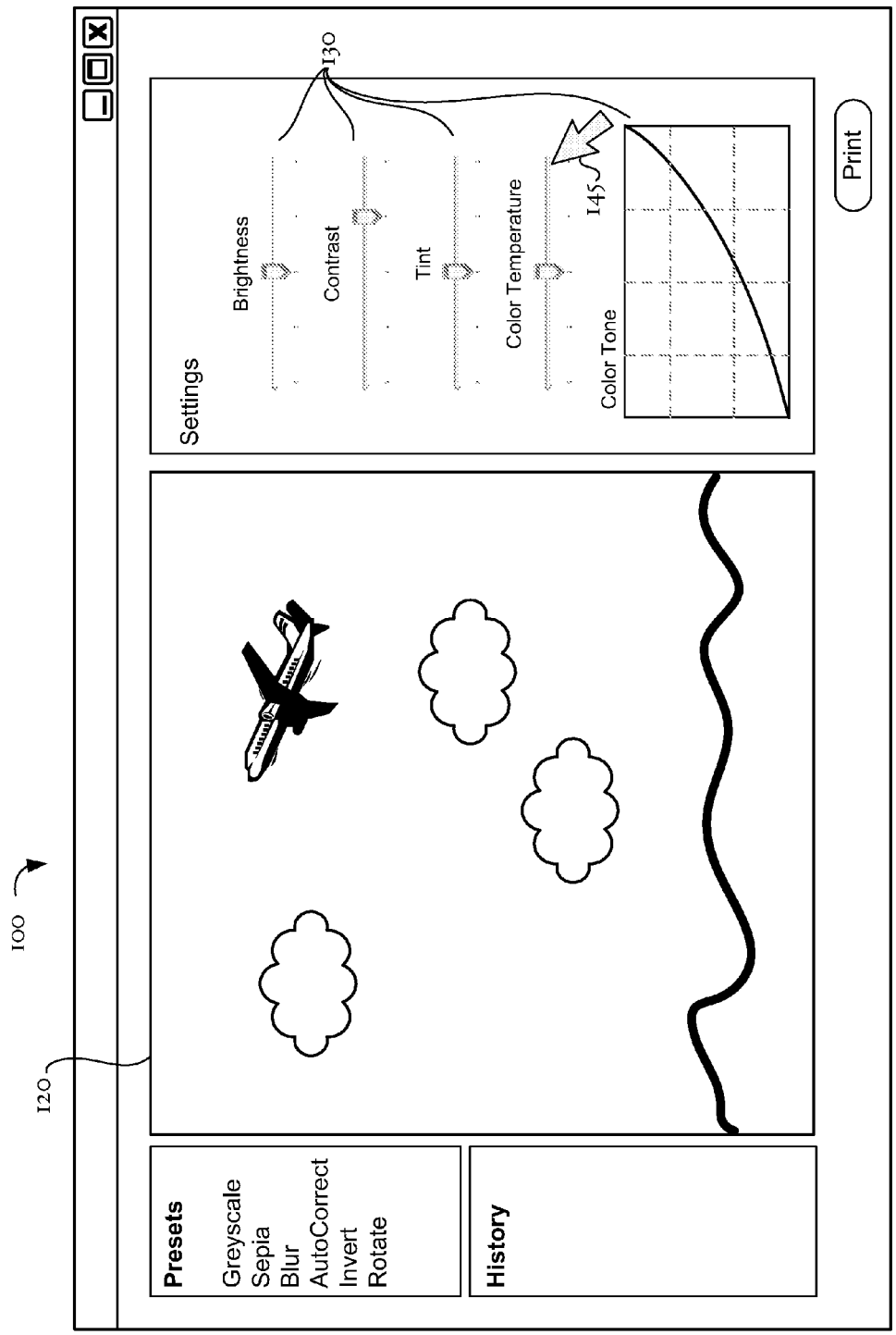
FIG. 1A shows an exemplary image editing user interface.

FIG. 1A shows a graphical user interface (GUI) 100 for an exemplary image manipulation software program that includes a presentation 120 of an image based on the image's data. The GUI creates an interactive presentation on a display device such as a computer monitor, for instance. The image is created by a digital camera, drawing software, animation software, video editing software, or other process, for example. An image has associated image data that conforms to an image type. Examples of image types include Joint Photographic Expert Group (JPEG), Portable Network Graphics (PNG), Graphic Interchange Format (GIF), Bitmap (BMP), Tagged Image File Format (TIFF), "RAW", or others. RAW image data is from the image sensor of a digital camera or image scanner and usually requires additional processing such as converting the data to JPEG format, for instance, before the data can be manipulated. This additional processing is referred to as demosaicing or digital development.

Figure 1B:
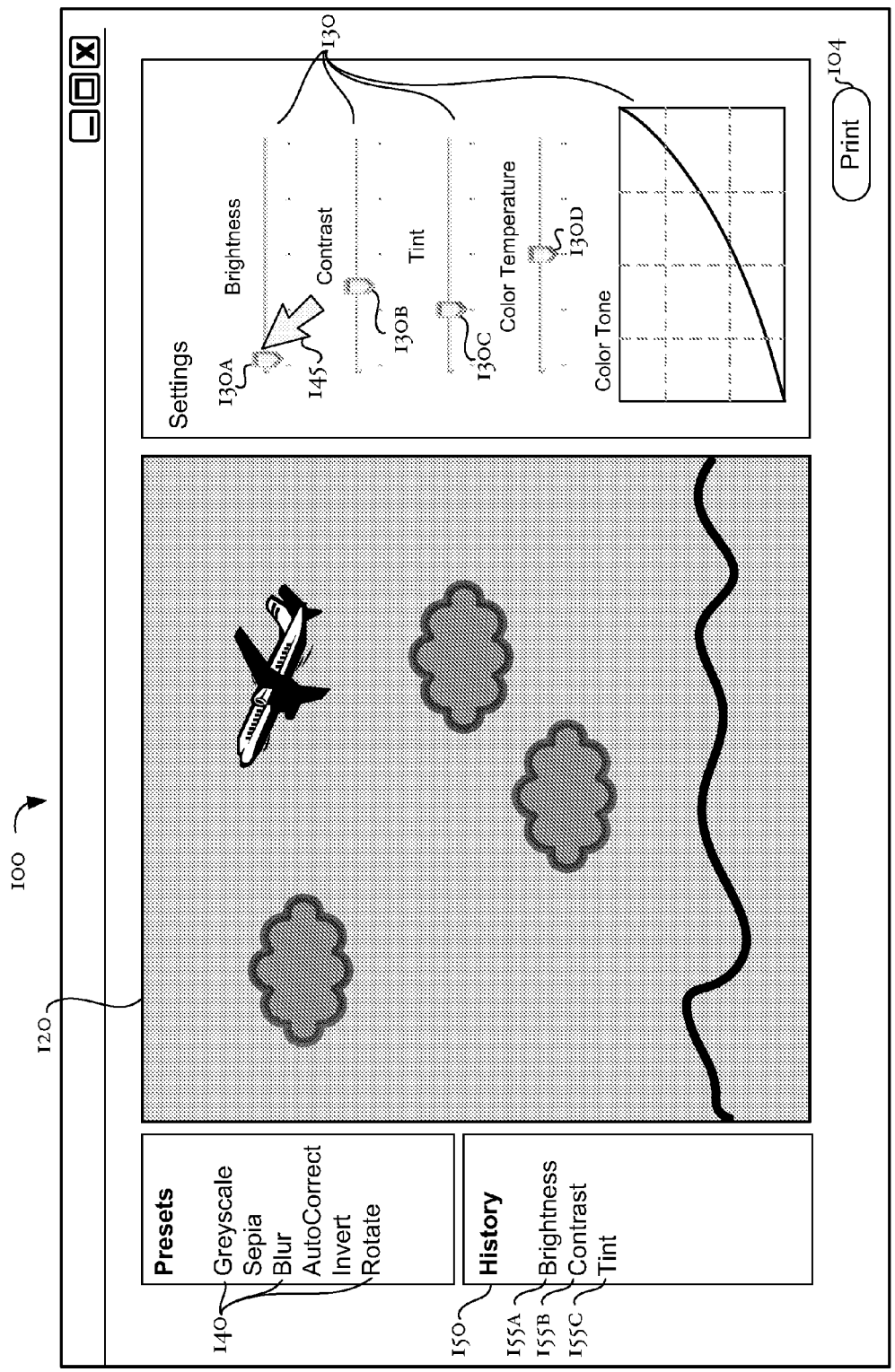
FIG. 1B shows adjusting image settings using the image editing user interface.

The GUI 100 allows user interaction through one or more input devices such as a keyboard and a mouse. A cursor 195 is manipulated by users through an input device in order to interact with GUI elements that affect the appearance of the image. For example, the cursor 195 can be manipulated to interact with image setting controls 130. FIG. 1B shows the modification of the appearance of an image by alteration of the image's settings. Each image setting 130A-D allows a user to customize a particular aspect of the image's appearance. For example, a user can adjust the image's brightness by moving a slider GUI element 130A associated with the brightness setting.

The value of the setting determines an associated transformation that is to be applied to the image's data to achieve the desired appearance. For example, a brightness value of 10 may darken the appearance of the image while a brightness value of 90 may cause the appearance of the image to brighten. Note that some changes to settings may alter image data without creating a noticeable change in the appearance of the image (e.g., because of the limitations of a user's output device). However, such changes are still deemed to change the appearance of the image. In various implementations, transformations are nondestructive. That is, the transformation used to create an appearance of the image does not alter the image's original image data. Instead, a copy of the image data is modified.

In general, settings can include, for example, white balance (including temperature and color tint), tone adjustments (exposure, highlight recovery, fill light, blacks, brightness contrast and tone curve adjustments), split tone adjustments (including highlight and shadow balance, and hue and saturation adjustments for each of highlights and shadows), color adjustments (including vibrance, saturation, hue, luminance and color specific adjustments of each), detail adjustments (including sharpening and noise reduction), lens correction (including chromatic aberration and lens vignetting adjustments), camera calibration adjustments other image settings.

In various implementations, in response to each adjustment of an image's settings 130 a history item (e.g., 155A, 155B and 155C) can be created and added to a history list 150. For example, if the tint setting 130C is adjusted, then a history item 155C corresponding to this adjustment is added to the history list 150. Subsequently, the contrast setting 130B is adjusted, then another history item corresponding to this adjustment is added to the history list 150 as history item 155B. Thus, the history list 150 contains a time ordered sequence of history items corresponding to user input changing image settings and the corresponding appearance of the image. In some implementations, consecutive history items of the same type (e.g., corresponding to multiple adjustments of the same setting) are coalesced into a single history item. For example, in response to a two consecutive adjustments of the brightness, first by +5, then by −2, a single history item 155A, corresponding to a brightness adjustment of +3, is added to the history list. In some implementations, history items can be nested. For example, several consecutive related adjustments are represented by a history item that can be expanded to reveal each individual adjustment among the several.

Each history item in the history list 150 represents the cumulative settings for the image at the time the history item was created. Thus, a history item represents all preceding setting adjustments used to produce the current appearance of an image. For example, the history item 155C represents the image's settings after the image has been transformed according to adjustment of a tint setting. The history item 155B represents the image's settings as affected by both the tint adjustment and a contrast adjustment. The history item 155A represents the settings of the image including the tint adjustment, the contrast adjustment and the most recently adjusted brightness setting 130A.

The GUI 100 includes one or more selectable image presets 140. Each image preset corresponds to one or more image setting values. For example, an image preset can include a transformation that causes the image to appear in grayscale or sepia tones. Another preset can cause the appearance to be subject to a blur or glow effect. Presets can be used to crop, rotate, flip, invert or apply red-eye correction, spot healing or other image effects. In general, a preset can correspond to any image transformation, which is sometimes referred to as an image filter or image effect. Presets can correspond to multiple transformations (e.g., sepia conversion and blurring). In some implementations, a user provides user input to configure particular presets (e.g., a radius parameter for a blur preset). Each selection of an image preset transforms the appearance of the image according to the transformation(s) associated with the preset. In some implementations, an image preset is considered an image setting. In other words, an image preset is used to adjust an appearance of an image just as adjusting a setting adjusts the image's appearance.

Figure 1C:
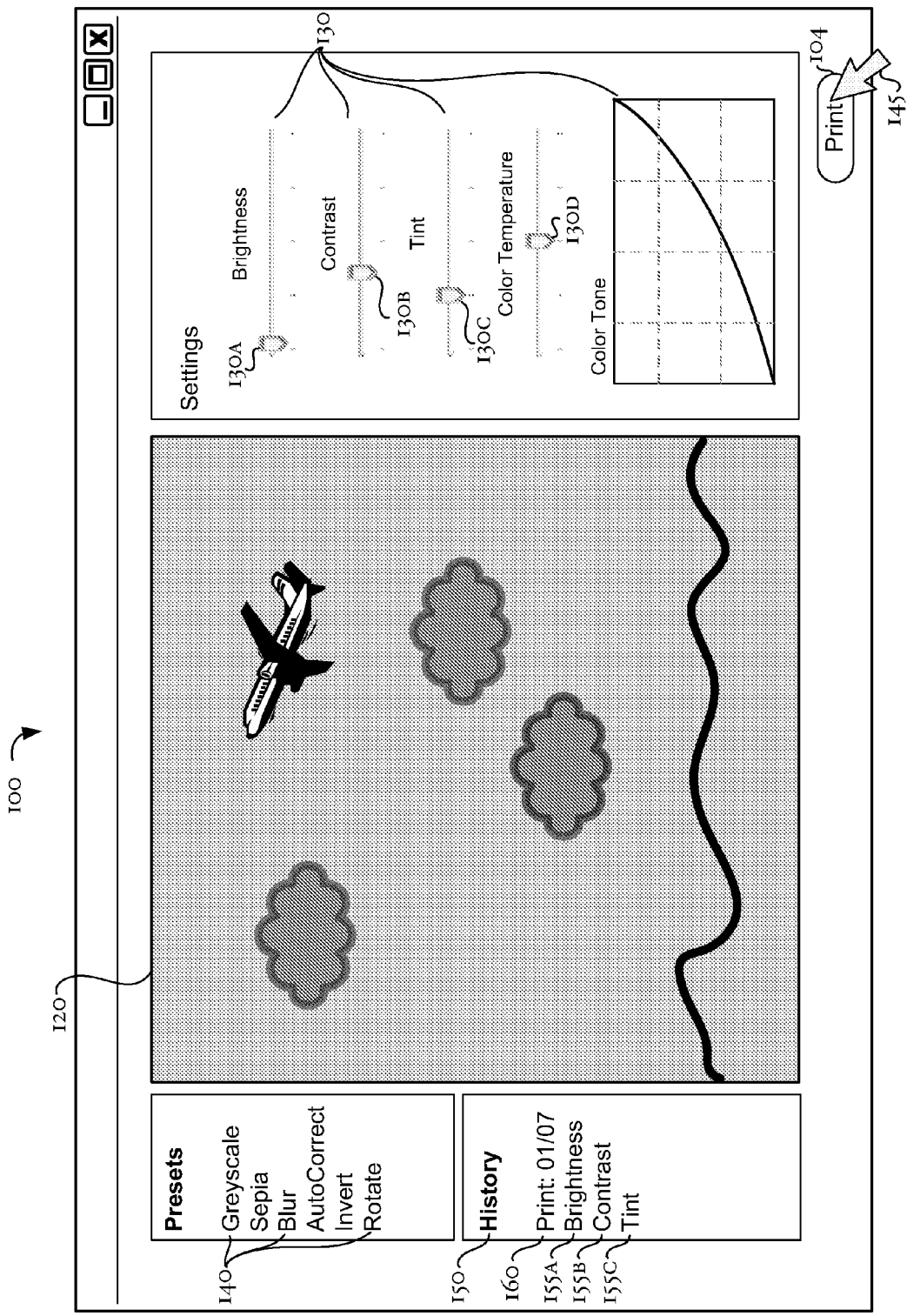
FIG. 1C shows providing a print request using the image editing user interface.

FIG. 1C shows the creation of a print marker. A user can print the current appearance of the image by selecting a print button 104 or other GUI element with an input device, or by providing a print request through other means such as from another software application or operating system. In response to the print request, a print marker 160 is created in the history list 150. The print marker represents an association between a date and time of the print request, the cumulative settings of the image at the time of the request, and the image.

Figure 1D:
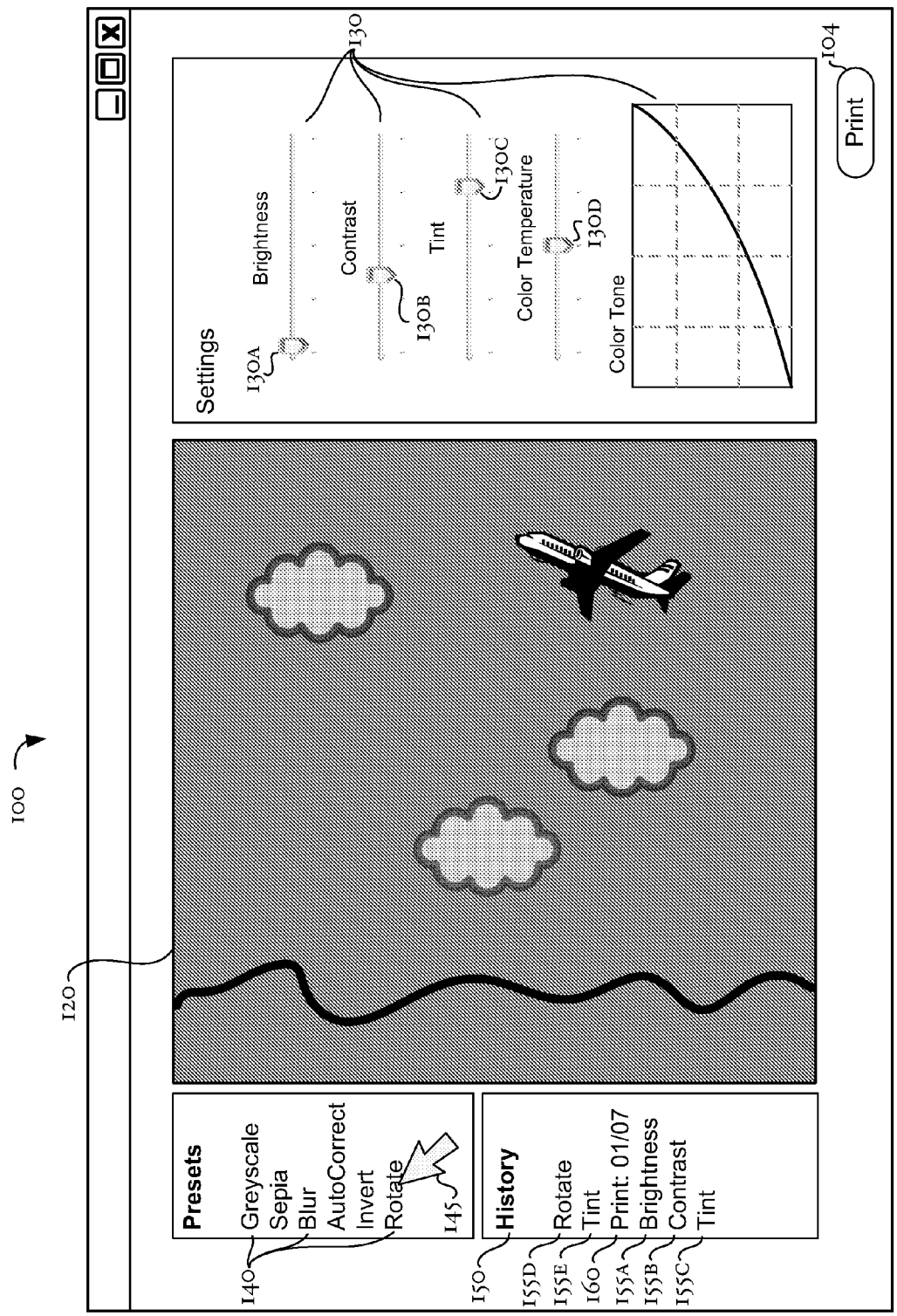
FIG. 1D shows further adjusting image settings using the image editing user interface.

FIG. 1D shows further adjustment of the image settings after printing. A user may make further adjustments to the image settings after the image has been printed, further affecting the presented 120 appearance of the image. These adjustments are presented in the history list 150. For example, in response to adjustment of the tint setting 130, a tint history item 155E is created and added to the history list 150. Likewise, in response to selecting a rotation preset 140, which adjusts an orientation setting of the image, a rotation item 155D is created and added to the history list 150.

Figure 1E:
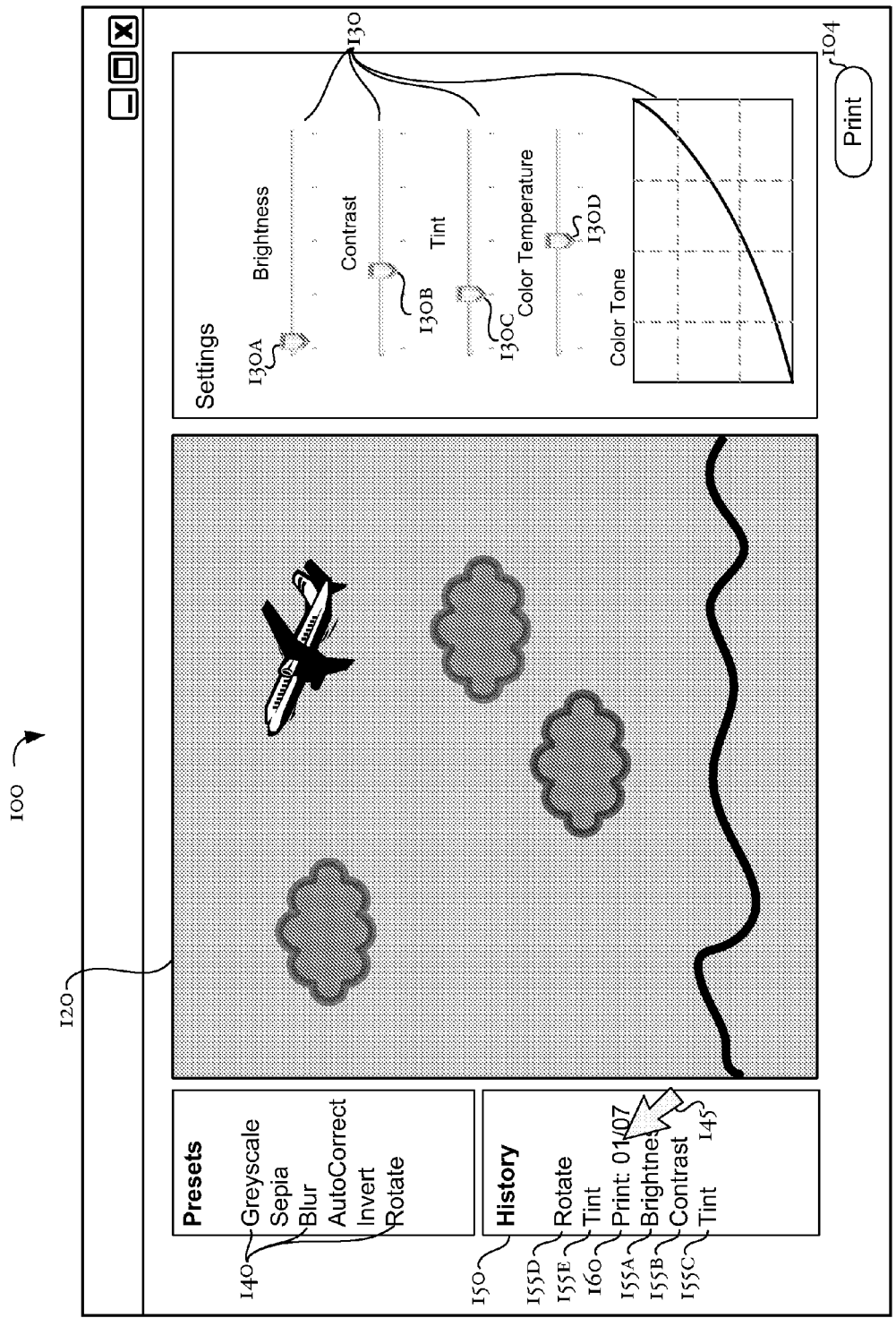
FIG. 1E shows restoring image settings using the image editing user interface.

FIG. 1E shows restoration of the image settings using a print marker. A print marker, such as the print marker 160 presented in the history list 150, is user selectable. Selecting the print marker 160 causes the image settings and hence the image appearance to return to what they were at the time the print marker was created. Thus, after selection of the printer marker 16, the appearance of the image in the presentation 120, corresponds to the appearance of the image when the print marker 160 was created (e.g., compare the presented image 120 in FIG. 1E with that of FIG. 1C).

Figure 2:
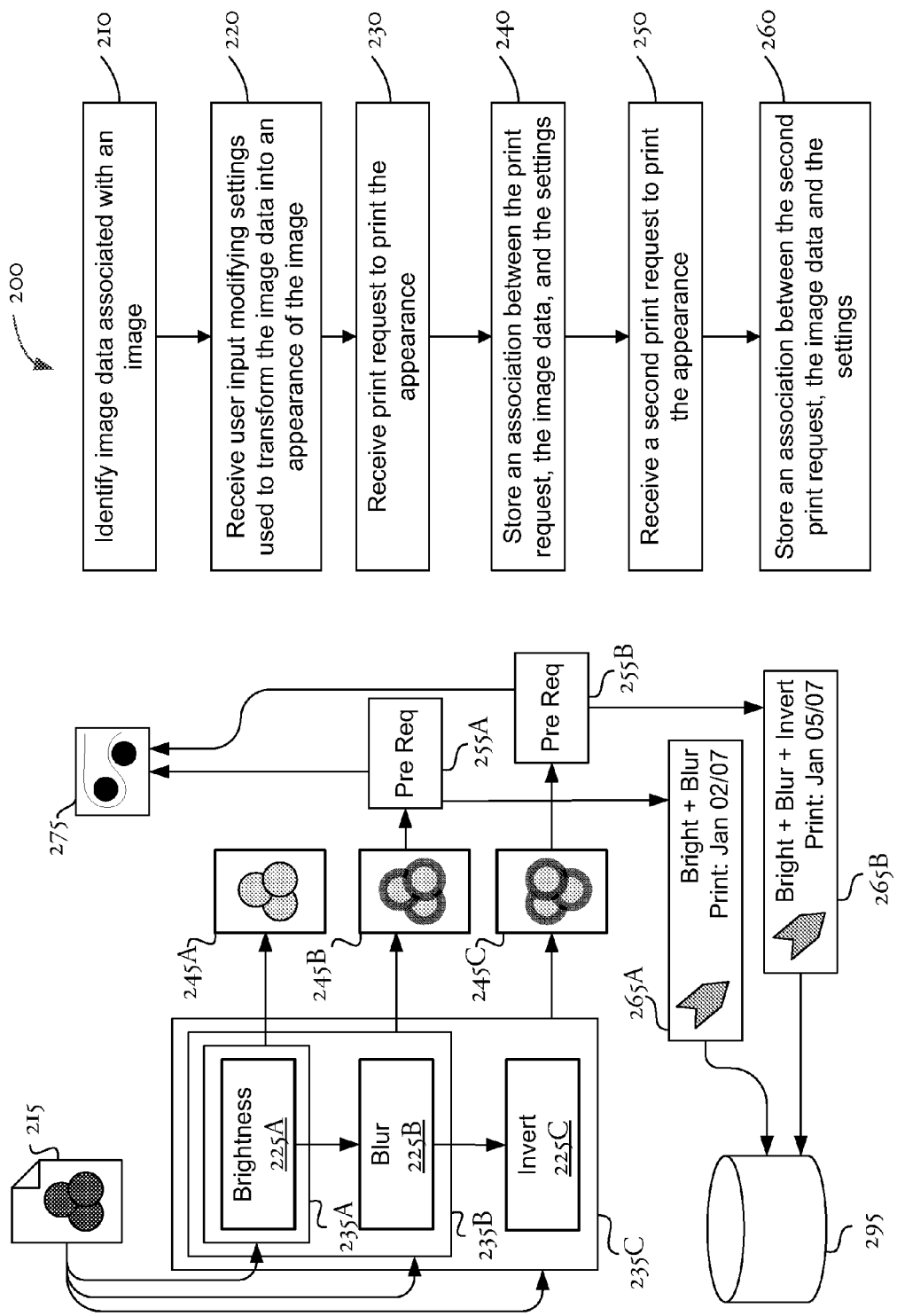
FIG. 2 shows a process for automatically generating print markers.

FIG. 2 shows a process 200 for automatically generating print markers in response to printing requests. Image data is identified (step 210). For example, image data 215 is received when user input is received selecting or identifying a corresponding image file. User input is received that modifies one or more settings associated with the image (step 220). For example, user input is received specifying a brightness setting adjustment 225A. The adjustment affects the image's current settings 235A and is used to generate an appearance of the image. The appearance 245A is generated from the image data 215 and a transformation corresponding to the settings 235A. Subsequent user input can be received specifying a blur setting 225B. The current image settings 235B refers to the cumulative effects of both the setting adjustments 225A and 225B. The appearance 245B is generated from the image data 215 and a transformation corresponding to the image settings 235B.

User input is accepted specifying a print request to print an appearance of the image (step 230). For example, a print request 255A can be received specifying that the appearance 245B be printed on a print device 275. In some implementations, additional user input can be accepted to customize the print request. For example, the user can select a printer, select a paper tray, identify a color profile or choose a file name (e.g., when printing to file format such as Adobe Portable Document Format or Adobe PostScript).

In response to the print request, a print marker is automatically created and stored (step 240). For example, the print marker 265A is created in response to the print request 255A and is stored on a computer-readable medium 295, such as an attached disk device, network attached storage service or a database. The print marker is added to the history list of the user interface (e.g., the user interface 100), such that the print marker is user selectable. The print marker represents an association of the settings, the image data or a reference to the image data (e.g., a file name, network location or a database identifier), and the date and time that the image was printed. The print marker can also include information about the print request such as printer settings (e.g., the printer selection, paper settings, or color profile selections) or other print related information. For example, in response to a print request 255B, a print marker 265B is created to associate print information with the image data 215 and the image settings 235B, which corresponds to the appearance 245B. In some implementations, the print marker is created in response to an acknowledgement that the appearance of the image has been successfully printed. For example, such a message can be received from the printer device 275.

In general, printing and manipulating the image can occur repeatedly as often as desired by the user. For example, a subsequent setting adjustment 225C can be received specifying that the appearance of the image be inverted. The image's current settings 235C, affected by the cumulative setting adjustments 225A-C, are used to transform the image data to generate the appearance 245C. When user input specifying a second print request for the appearance is received (step 250), a second print marker is created and stored (step 260). For example, the second print marker 265B associates information pertaining to the second print request 255B with the image data 215 and the settings 225A-C which are used to generate the appearance 245C.

Figure 3:
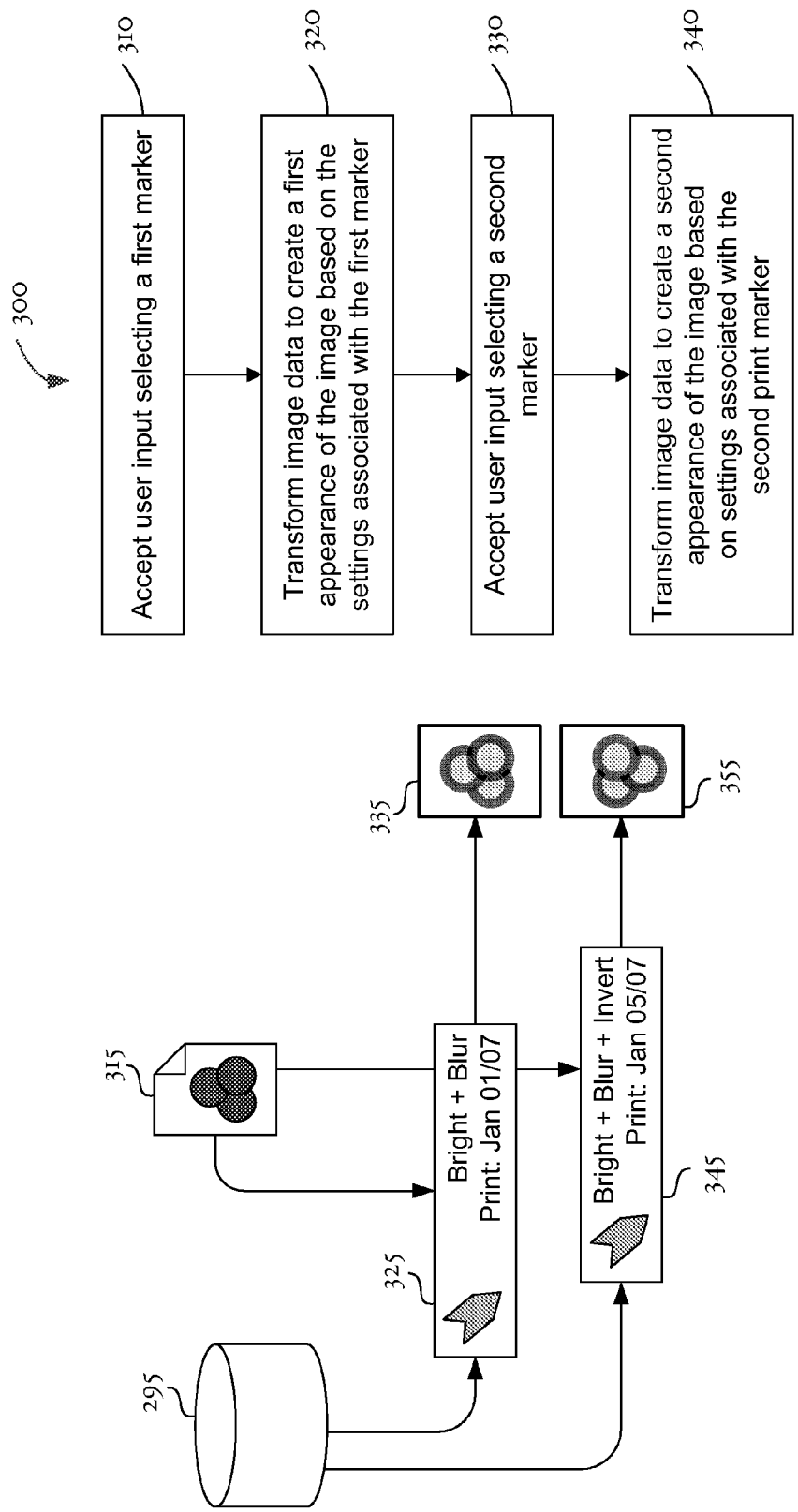
FIG. 3 shows a process for recalling image settings using a print marker.

FIG. 3 shows a process 300 for recalling the appearance of an image using a print marker. User input selecting a particular print marker is accepted (step 310). For example, print markers 325 and 345 can be presented in a history list, such as the history list 150 of the GUI 100 shown in FIG. 1. In general, when a print marker is selected, the appearance of the image (e.g., as presented in the GUI 100) varies compared to the appearance of the image when the print marker was generated. Any number of image manipulations may have occurred since the print request. In response to selecting the particular print marker, the image data is transformed to create a first appearance based on the settings associated with the particular print marker (step 320). The appearance of the image can be presented in a user interface such as the user interface 100 shown in FIG. 1.

For example, the settings associated with the print marker 325 are used to transform image data 315 to create an appearance 335. The resultant appearance 335 corresponds to the appearance of the image data at the time the print marker 325 was created (and the appearance printed). Although the appearance of the image corresponds to the appearance of the image as taken when the print marker 325 was created, the appearance of the image can be subject to subsequent user manipulations. The user can further adjust the settings of the image to generate other appearances of the image. For example, the user can adjust a setting or select an image preset. Alternatively, the user can select another print marker.

Figure 4:
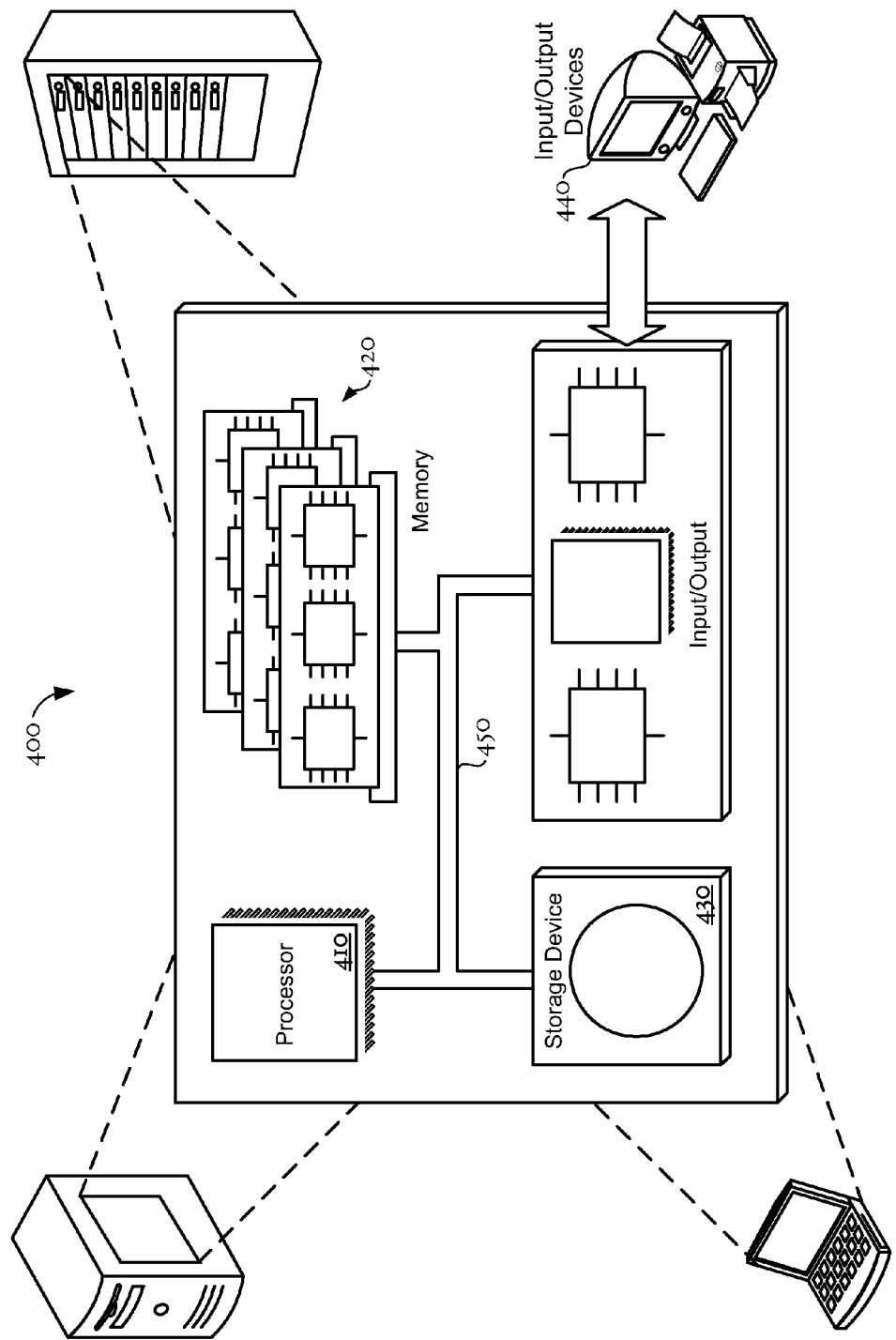
FIG. 4 is a schematic diagram of an exemplary computer system.

User input is accepted selecting a second print marker (step 330). For example, the user can select print marker 345. In response to selecting the second print marker, the image data is transformed to create a second appearance based on the settings associated with the second print marker (step 340). For example, the settings associated with the print marker 345 are used to transform the image data 315 to create an appearance 355. The second appearance of the image can be presented in the user FIG. 4 is a schematic diagram of an exemplary computer system 400. The system 400 can be used for practicing operations described in association with the process 200 or the process 300. The system 400 can include a processor 410, a memory 420, a storage device 430, and an input/output device 440. Each of the components 410, 420, 430, and 440 are interconnected using a system bus 450. The processor 410 is capable of processing instructions for execution within the system 400. Such executed instructions can implement one or more components of GUI 100, process 200 and process 300, for example. The processor 410 includes one or more processing cores which are single or multi-threaded. The processor 410 is capable of processing instructions stored in the memory 420 or on the storage device 430 to display graphical information for a user interface on the input/output device 440.

The memory 420 is a computer readable medium such as volatile or non volatile that stores information within the system 400. The memory 420 could store data structures representing settings, image data, and print markers, for example. The storage device 430 is capable of providing persistent storage for the system 400. The storage device 430 may be a floppy disk device, a hard disk device, an optical disk device, or a tape device, or other suitable persistent storage means. The input/output device 440 provides input/output operations for the system 400. In one implementation, the input/output device 440 includes a keyboard and/or pointing device. In another implementation, the input/output device 440 includes a display unit for displaying graphical user interfaces.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results. In some implementations, a user is allowed to select multiple images and manipulate all of the images concurrently. When a user adjusts a particular setting the appearance of all images are accordingly affected. Likewise, a request can be received to print multiple images. In response to such a print request a print marker for each image is created.

What is claimed is:

1. A computer-implemented method, comprising:

accepting, in a computer system, a first request to print a first image using first settings, the first image comprising first image data and where the first settings specify one or more nondestructive first transformations of the first image data that create a first appearance of the first image;

in response to the first request and using the computer system, storing in a list a first association between a time of the first request, the first image, and the first settings, where the first association in the list is user-selectable through a graphical user interface to automatically re-create the first appearance of the first image after one or more subsequent transformations of the first image data;

accepting, in the computer system, a second request to print a second image using second settings, the second image comprising second image data and where the second settings specify one or more nondestructive second transformations of the second image data that create a second appearance of the second image; and in response to the second request and using the computer system, storing in the list a second association between a time of the second request, the second image, and the second settings, where the second association in the list is user-selectable through the graphical user interface to automatically re-create the second appearance of the second image after one or more subsequent transformations of the second image data.

2. The method of claim 1, further comprising:
accepting user input selecting an association in the list; and
applying the selected association's respective settings to the selected association's respective image data to determine transformed image data.

3. The method of claim 2, further comprising:
providing the transformed image data to the graphical user interface or a printing device.

4. The method of claim 1 where storing in the list includes:
maintaining an order of the list such that associations in the list are ordered according to their respective times.

5. The method of claim 1 where:
the first image and the second image are the same; or
the first image and the second image are different.

6. The method of claim 1, further comprising:
accepting user input specifying the first settings or the second settings.

7. The method of claim 1 where image settings include one or more of white balance adjustments, tone adjustments, split tone adjustments, color adjustments, detail adjustments, lens corrections, camera calibrations, and image effects.

8. The method of claim 7 where:
white balance adjustments includes temperature and color tint adjustments;
tone adjustments include exposure, highlight recovery, fill light, blacks, brightness contrast and tone curve adjustments;
split tone adjustments include highlight and shadow balance, and hue and saturation adjustments for each of highlights and shadows;
color adjustments include vibrance, saturation, hue, luminance and color specific adjustments of each;
detail adjustments include sharpening and noise reduction;
lens corrections include chromatic aberration and lens vignetting adjustments; and
image effects include blur, crop, rotate, flip, invert, red-eye correction and spot healing.

9. A computer program product, encoded on a computer-readable storage device, operable to cause data processing apparatus to perform operations comprising:

accepting a first request to print a first image using first settings, the first image comprising first image data and where the first settings specify one or more nondestructive first transformations of the first image data that create a first appearance of the first image;

in response to the first request, storing in a list a first association between a time of the first request, the first image, and the first settings, where the first association in the list is user-selectable through a graphical user interface to automatically re-create the first appearance of the first image after one or more subsequent transformations of the first image data;

accepting, in the computer system, a second request to print a second image using second settings, the second image comprising second image data and where the second settings specify one or more nondestructive second transformations of the second image data that create a second appearance of the second image; and in response to the second request, storing in the list a second association between a time of the second request, the second image, and the second settings, where the second association in the list is user-selectable through the graphical user interface to automatically re-create the second appearance of the second image after one or more subsequent transformations of the second image data.

10. The program product of claim 9, further comprising operations for:
accepting user input selecting an association in the list; and
applying the selected association's respective settings to the selected association's respective image data to determine transformed image data.

11. The program product of claim 10, further comprising operations for:
providing the transformed image data to the graphical user interface or a printing device.

12. The program product of claim 9 where storing in the list includes:
maintaining an order of the list such that associations in the list are ordered according to their respective times.

13. The program product of claim 9 where:
the first image and the second image are the same; or
the first image and the second image are different.

14. The program product of claim 9, further comprising operations for:
accepting user input specifying the first settings or the second settings.

15. The program product of claim 9 where image settings include one or more of white balance adjustments, tone adjustments, split tone adjustments, color adjustments, detail adjustments, lens corrections, camera calibrations, and image effects.

16. The program product of claim 15 where:
white balance adjustments includes temperature and color tint adjustments;
tone adjustments include exposure, highlight recovery, fill light, blacks, brightness contrast and tone curve adjustments;
split tone adjustments include highlight and shadow balance, and hue and saturation adjustments for each of highlights and shadows;
color adjustments include vibrance, saturation, hue, luminance and color specific adjustments of each;

detail adjustments include sharpening and noise reduction;
lens corrections include chromatic aberration and lens vignetting adjustments; and
image effects include blur, crop, rotate, flip, invert, red-eye correction and spot healing.

17. A system comprising:
a display device capable of presenting a graphical user interface;
one or more processors configured to perform the following:
   accepting a first request to print a first image using first settings, the first image comprising first image data and where the first settings specify one or more non-destructive first transformations of the first image data that create a first appearance of the first image on the display device;
   in response to the first request, storing in a list a first association between a time of the first request, the first image, and the first settings, where an association in the list is user-selectable through the graphical user interface to automatically re-create the first appearance of the first image after one or more subsequent transformations of the first image data;
   accepting, in the computer system, a second request to print a second image using second settings, the second image comprising second image data and where the second settings specify one or more nondestructive second transformations of the second image data that create a second appearance of the second image on the display device; and
   in response to the second request, storing in the list a second association between a time of the second request, the second image, and the second settings, where the second association in the list is user-selectable through the graphical user interface to automatically re-create the second appearance of the second image after one or more subsequent transformations of the second image data.

18. The system of claim 17, where the processors are further configured to perform the following:
   accepting user input selecting an association in the list; and
   applying the selected association's respective settings to the selected association's respective image data to determine transformed image data.

19. The system of claim 18, where the processors are further configured to perform the following:
   providing the transformed image data to the graphical user interface or a printing device.

20. The system of claim 17 where storing in the list includes:
   maintaining an order of the list such that associations in the list are ordered according to their respective times.

21. The system of claim 17 where:
   the first image and the second image are the same; or
   the first image and the second image are different.

22. The system of claim 17, where the processors are further configured to perform the following:
   accepting user input specifying the first settings or the second settings.

23. The system of claim 17 where image settings include one or more of white balance adjustments, tone adjustments, split tone adjustments, color adjustments, detail adjustments, lens correction, camera calibration, and image effects.

24. The system of claim 23 where:
   white balance adjustments includes temperature and color tint adjustments;
   tone adjustments include exposure, highlight recovery, fill light, blacks, brightness contrast and tone curve adjustments;
   split tone adjustments include highlight and shadow balance, and hue and saturation adjustments for each of highlights and shadows;
   color adjustments include vibrance, saturation, hue, luminance and color specific adjustments of each;
   detail adjustments include sharpening and noise reduction;
   lens correction include chromatic aberration and lens vignetting adjustments; and
   image effects include blur, crop, rotate, flip, invert, red-eye correction and spot healing.

* * * * *